United States Patent
Coady et al.

(10) Patent No.: US 11,623,342 B2
(45) Date of Patent: Apr. 11, 2023

(54) CONFIGURABLE SERVICE ISOLATION ZONES FOR SERVICE OF EQUIPMENT EMPLOYING MOBILE ROBOTS

(71) Applicant: ALERT INNOVATION INC., North Billerica, MA (US)

(72) Inventors: Matthew W. Coady, Hollis, NH (US); William J. Fosnight, Windham, NH (US); Alejandro Sierra, Lowell, MA (US); David A. Lachance, Waltham, MA (US); Michael Chesna, Saugus, MA (US); Patrick Renard, Lunenburg, MA (US); Chris Dancewicz, Salem, NH (US); Bryce Germain, Waltham, MA (US)

(73) Assignee: WALMART APOLLO, LLC, Bentonville, AR (US)

( * ) Notice: Subject to any disclaimer, the term of this patent is extended or adjusted under 35 U.S.C. 154(b) by 440 days.

(21) Appl. No.: 15/838,836

(22) Filed: Dec. 12, 2017

(65) Prior Publication Data
US 2019/0176323 A1  Jun. 13, 2019

(51) Int. Cl.
*B25J 9/16* (2006.01)
*B65G 1/137* (2006.01)
(Continued)

(52) U.S. Cl.
CPC ............ *B25J 9/1602* (2013.01); *A61B 5/24* (2021.01); *B25J 9/1676* (2013.01); *B60L 3/12* (2013.01);
(Continued)

(58) Field of Classification Search
CPC ......... A61B 5/04; B25J 9/1602; B25J 9/1676; G05D 1/0297; G05D 2201/0216;
(Continued)

(56) References Cited

U.S. PATENT DOCUMENTS

| 5,179,329 A | 1/1993 | Nishikawa et al. |
| 5,472,309 A | 12/1995 | Bernard et al. |

(Continued)

FOREIGN PATENT DOCUMENTS

| EP | 2650237 B1 | 11/2014 |
| EP | 2651786 B1 | 5/2016 |

(Continued)

OTHER PUBLICATIONS

International Search Report and Written Opinion dated May 31, 2019 in International Patent Application No. PCT/US2018/063891.

(Continued)

*Primary Examiner* — Stephen Holwerda
(74) *Attorney, Agent, or Firm* — Vierra Magen Marcus LLP

(57) ABSTRACT

A safety system is disclosed for failsafe servicing of areas within an order fulfillment facility. During normal operation, a number of battery-powered robots receive wireless instructions from a management control system (MCS) to transfer items to/from workstations or storage shelves in a multi-level storage structure. The order fulfillment facility may be divided into dynamically configurable service zones. When service is required in a service zone, different safety protocols may be employed based on a determination as to the priority level of service required and/or the estimated length of time service will take. One safety protocol involves physically blocking all access points to a service area with mechanical guards, so that order fulfillment operations may be proceed around the service zone while service is performed.

22 Claims, 12 Drawing Sheets

(51) Int. Cl.
*G01S 15/04* (2006.01)
*B65G 1/04* (2006.01)
*B60L 3/12* (2006.01)
*G05B 19/418* (2006.01)
*A61B 5/24* (2021.01)

(52) U.S. Cl.
CPC ........... *B65G 1/0421* (2013.01); *B65G 1/137* (2013.01); *G01S 15/04* (2013.01); *G05B 19/41895* (2013.01); *B65G 1/0492* (2013.01); *B65G 1/1378* (2013.01); *B65G 2207/40* (2013.01); *G05B 2219/32037* (2013.01); *G05B 2219/40202* (2013.01); *G05B 2219/45045* (2013.01); *G05D 2201/0216* (2013.01)

(58) Field of Classification Search
CPC ..... G01S 15/04; B60L 3/12; G05B 19/41895; G05B 2219/40202; G05B 2219/32037; G05B 2219/45045; B65G 1/137; B65G 1/0421; B65G 1/1378; B65G 1/0492; B65G 2207/40
See application file for complete search history.

(56) References Cited

U.S. PATENT DOCUMENTS

| | | | |
|---|---|---|---|
| 5,642,976 A | 7/1997 | Konstant | |
| 6,289,260 B1 | 9/2001 | Bradley et al. | |
| 6,539,876 B1* | 4/2003 | Campbell | G11B 15/6835 |
| 7,255,525 B2 | 8/2007 | Smith et al. | |
| 7,591,630 B2 | 9/2009 | Lert, Jr. | |
| 7,768,549 B2 | 8/2010 | Cofer | |
| 7,861,844 B2 | 1/2011 | Hayduchok et al. | |
| 7,894,932 B2 | 2/2011 | Mountz et al. | |
| 7,894,933 B2 | 2/2011 | Mountz et al. | |
| 7,991,505 B2 | 8/2011 | Lert, Jr. et al. | |
| 8,104,601 B2 | 1/2012 | Hayduchok et al. | |
| 8,276,740 B2 | 10/2012 | Hayduchok et al. | |
| 8,311,902 B2 | 11/2012 | Mountz et al. | |
| 8,425,173 B2 | 4/2013 | Lert et al. | |
| 8,447,665 B1 | 5/2013 | Schoenharl et al. | |
| 8,483,869 B2 | 7/2013 | Wurman et al. | |
| 8,527,325 B1 | 9/2013 | Atreya et al. | |
| 8,594,835 B2 | 11/2013 | Lert et al. | |
| 8,622,194 B2 | 1/2014 | DeWitt et al. | |
| 8,626,335 B2 | 1/2014 | Wurman et al. | |
| 8,694,152 B2 | 4/2014 | Cyrulik et al. | |
| 8,718,814 B1 | 5/2014 | Clark et al. | |
| 8,740,538 B2 | 6/2014 | Lert et al. | |
| 8,831,984 B2 | 9/2014 | Hoffman et al. | |
| 8,892,240 B1 | 11/2014 | Vliet et al. | |
| 8,965,562 B1 | 2/2015 | Wurman et al. | |
| 8,972,045 B1 | 3/2015 | Mountz et al. | |
| 8,983,647 B1 | 3/2015 | Dwarakanath et al. | |
| 9,008,828 B2 | 4/2015 | Worsley | |
| 9,008,829 B2 | 4/2015 | Worsley | |
| 9,008,830 B2 | 4/2015 | Worsley | |
| 9,020,632 B2 | 4/2015 | Naylor | |
| 9,037,286 B2 | 5/2015 | Lert | |
| 9,051,120 B2 | 6/2015 | Lert et al. | |
| 9,096,375 B2 | 8/2015 | Lert et al. | |
| 9,111,251 B1 | 8/2015 | Brazeau | |
| 9,129,250 B1 | 9/2015 | Sestini et al. | |
| 9,139,363 B2 | 9/2015 | Lert | |
| 9,242,798 B2 | 1/2016 | Guan | |
| 9,260,245 B2 | 2/2016 | Este et al. | |
| 9,321,591 B2 | 4/2016 | Lert et al. | |
| 9,330,373 B2 | 5/2016 | Mountz et al. | |
| 9,334,113 B2 | 5/2016 | Naylor | |
| 9,334,116 B2 | 5/2016 | DeWitt et al. | |
| 9,378,482 B1 | 6/2016 | Pikler et al. | |
| 9,423,796 B2 | 8/2016 | Sullivan et al. | |
| 9,428,295 B2 | 8/2016 | Vliet et al. | |
| 2005/0047895 A1* | 3/2005 | Lert | B65G 1/1378 414/273 |
| 2006/0257236 A1 | 11/2006 | Stingel, III et al. | |
| 2007/0127691 A1 | 6/2007 | Lert, Jr. | |
| 2010/0076591 A1 | 3/2010 | Lert, Jr. | |
| 2010/0316468 A1 | 12/2010 | Lert et al. | |
| 2010/0316469 A1 | 12/2010 | Lert et al. | |
| 2010/0316470 A1 | 12/2010 | Lert et al. | |
| 2010/0322746 A1 | 12/2010 | Lert | |
| 2010/0322747 A1 | 12/2010 | Lert et al. | |
| 2012/0101627 A1 | 4/2012 | Lert | |
| 2012/0185080 A1* | 7/2012 | Cyrulik | B65G 47/883 700/214 |
| 2012/0186942 A1 | 7/2012 | Toebes et al. | |
| 2012/0195720 A1 | 8/2012 | Sullivan et al. | |
| 2013/0246229 A1 | 9/2013 | Mountz et al. | |
| 2014/0031972 A1* | 1/2014 | DeWitt | B65G 1/04 700/214 |
| 2014/0088758 A1 | 3/2014 | Lert et al. | |
| 2014/0212249 A1 | 7/2014 | Kawano | |
| 2014/0271063 A1 | 9/2014 | Lert et al. | |
| 2014/0288696 A1 | 9/2014 | Lert | |
| 2014/0308098 A1 | 10/2014 | Lert et al. | |
| 2014/0343717 A1* | 11/2014 | Dorval | G05D 1/00 700/217 |
| 2015/0239120 A1* | 8/2015 | Yamamoto | H04L 67/10 901/3 |
| 2015/0266672 A1 | 9/2015 | Lert et al. | |
| 2015/0286967 A1 | 10/2015 | Lert et al. | |
| 2015/0375938 A9 | 12/2015 | Lert et al. | |
| 2016/0016733 A1 | 1/2016 | Lert | |
| 2016/0075512 A1 | 3/2016 | Lert | |
| 2017/0043953 A1 | 2/2017 | Battles et al. | |
| 2017/0158430 A1 | 6/2017 | Raizer | |
| 2017/0190516 A1 | 7/2017 | Cyrulik et al. | |
| 2017/0267452 A1 | 9/2017 | Goren et al. | |
| 2017/0297820 A1 | 10/2017 | Grinnell et al. | |
| 2017/0330142 A1 | 11/2017 | Kanellos et al. | |

FOREIGN PATENT DOCUMENTS

| | | |
|---|---|---|
| EP | 2651787 B1 | 5/2016 |
| EP | 3081511 A2 | 10/2016 |
| WO | 2005097550 | 10/2005 |
| WO | 2012083055 | 6/2012 |
| WO | 2016033233 A1 | 3/2016 |
| WO | 2016172793 A1 | 11/2016 |
| WO | 2016199033 A1 | 12/2016 |
| WO | 2017064401 A1 | 4/2017 |

OTHER PUBLICATIONS

English language Abstract for WO2017064401 published Apr. 20, 2017.
Response to Office Action filed Jan. 28, 2021 in European Patent Application No. 18830338.2.
Office Action dated Jun. 28, 2021 in Japanese Patent Application No. 2020-531994.
Office Action dated Feb. 4, 2022 in European Patent Application No. 18830338.2.

* cited by examiner

CONFIGURABLE SERVICE ISOLATION ZONES FOR SERVICE OF EQUIPMENT EMPLOYING MOBILE ROBOTS

BACKGROUND

Traditional order fulfillment facilities include mobile robots which transfer order fulfillment inventory to and from storage shelves within a storage space where the inventory is stored. It happens from time to time that repairs or service is required to an area of the storage facility in which the mobile robots travel. This may for example occur due to a malfunctioning mobile robot, or damage to an area of the storage space within the order fulfillment facility. When performing such service, it is important that the service technician avoid working within an area where mobile robots can travel during normal operation of the facility. The mobile robots can move for example at 6-10 m/s, and can cause serious bodily injury or death upon a collision with a service technician.

Some facility safety systems attempt to track the locations of mobile robots to ensure that the space requiring service is safe to enter. For example, U.S. Patent Application Publication No. 2014/0343717, entitled "Automated Storage and Retrieval System with Integral Secured Personnel Access Zones and Remote Rover Shutdown," discloses a service safety system which attempts to understand mobile robot locality (i.e., where each robot is at all times) using sensors to detect and track the motion of robots in and out of service zone's master control system. The safety system then attempts to disable robots known to be in a service zone, or robots of unknown position, allowing the remaining robots to continue operation. However, this approach demands that the safety system ascertain robot position with the certainty required to meet ISO13849 PLd (i.e., $10^{-7}$ to $10^{-6}$ safety failures per hour), which is very difficult to achieve, and even more difficult to verify. Such a system must utilize sensors not designed or tested for human safety applications, and also employ complex software to track robot position. Complex safety systems are inherently more vulnerable to design or configuration errors that, in applications such as these, can have dire consequences for a technician working in the robot workspace.

SUMMARY

The present technology relates to a safety system allowing human servicing of areas within an automated order fulfillment facility. During normal operation, a number of battery-powered mobile robots receive wireless instructions from a management control system (MCS) to transfer items to/from order fulfillment stations and/or storage shelves in a multi-level storage structure. In accordance with aspects of the present technology, one or more dynamically configurable service zones may be defined using mechanical guards which physically block all mobile robot access points into the one or more service zones. Each physical guard may include a safety-rated interlock switch in communication with a central safety controller. Once the central safety controller determines from the interlocks that an isolated service zone has been established (i.e., all entry into the service zone is blocked by the physical guards), the central safety controller may send a signal to the MCS to resume operation of the mobile robots in an active perimeter around the isolated service zone.

In embodiments, the present technology relates to a safety system for an order fulfillment facility comprising at least a two dimensional array of storage locations and a space configured to allow mobile robots to move adjacent the storage locations to perform order fulfillment operations at the storage locations, the safety system comprising: a plurality of zones within the space; and a plurality of mechanical guards around a zone of the plurality of zones to define the zone as a service zone, the plurality of mechanical guards configured to physically block the mobile robots from entering the service zone as the mobile robots perform the order fulfillment operations in the plurality of zones around the service zone.

In further embodiments, the present technology relates to a safety system for an order fulfillment facility comprising at least a two dimensional array of storage locations, a track system configured to allow mobile robots to move adjacent the storage locations to perform order fulfillment operations at the storage locations, and a deck extending into and around the two dimensional array of storage locations, the safety system comprising: a plurality of zones within a space defined by at least one of the track system and deck; a plurality of mechanical guards mounted with respect to at least one of the track system and deck to define one of the zones of the plurality of zones as a service zone, the plurality of mechanical guards configured to prevent the mobile robots from entering the service zone.

In another embodiment, the present technology relates to a safety system for an order fulfillment facility comprising at least a two dimensional array of storage locations and a space configured to allow mobile robots to move adjacent the storage locations to perform order fulfillment operations at the storage locations, the safety system comprising: a plurality of zones within the space; a plurality of mechanical guards around a zone of the plurality of zones to define the zone as a service zone, the plurality of mechanical guards configured to prevent the mobile robots from entering the service zone as the mobile robots perform the order fulfillment operations in the plurality of zones around the service zone; and a control system comprising one or more processors configured to implement a safety protocol for safe servicing within the service zone.

In a further embodiment, the present technology relates to a safety system for an order fulfillment facility comprising at least a two dimensional array of storage locations, a track system configured to allow mobile robots to move adjacent the storage locations to perform order fulfillment operations at the storage locations, and a deck extending into and around the two dimensional array of storage locations, the safety system comprising: a plurality of zones within a space defined by at least one of the track system and deck; and mechanical guard means for physically blocking entry of the mobile robots into a zone of the plurality of zones where service is to be performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present technology, roughly described, relates to a safety system for safe servicing of areas within an automated order fulfillment facility in which many or all robots can access each storage location. During normal operation, a number of battery-powered robots receive wireless instructions from a management control system (MCS) to transfer items to/from a number of workstations and storage shelves. While the storage shelves may be arranged in a wide variety of configurations, in one example, the storage shelves may be arrayed in multiple aisles, with each aisle including a two-dimensional array of storage shelves arrayed in rows and columns on each side of the aisle. The robots may travel between different aisles on a deck. In embodiments, there may be multiple levels of decks.

In accordance with aspects of the present technology, the order fulfillment facility may be divided into one or more service zones defined by mechanical guards blocking all access points to a defined service zone so as to completely isolate the service zone against entry by a mobile robot. The size of a service zone may be dynamically configured, depending on which combination of mechanical guards are deployed to isolate the service zone. As explained below, a service zone may be defined isolating a section of storage shelves, and/or a service zone may be defined to isolate a deck.

In a further aspect of the present technology, different safety protocols may be used based on a determination as to the priority level of service required within a service zone and/or the estimated service time. As explained below, different safety protocols may be implemented for low priority and high priority service tasks, as well as for quick and lengthy service tasks.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower" and "vertical" and "horizontal" as may be used herein are by way of example and for illustrative purposes only, and are not meant to limit the description of the invention inasmuch as the referenced item can be exchanged in position and orientation.

Figure 1A:
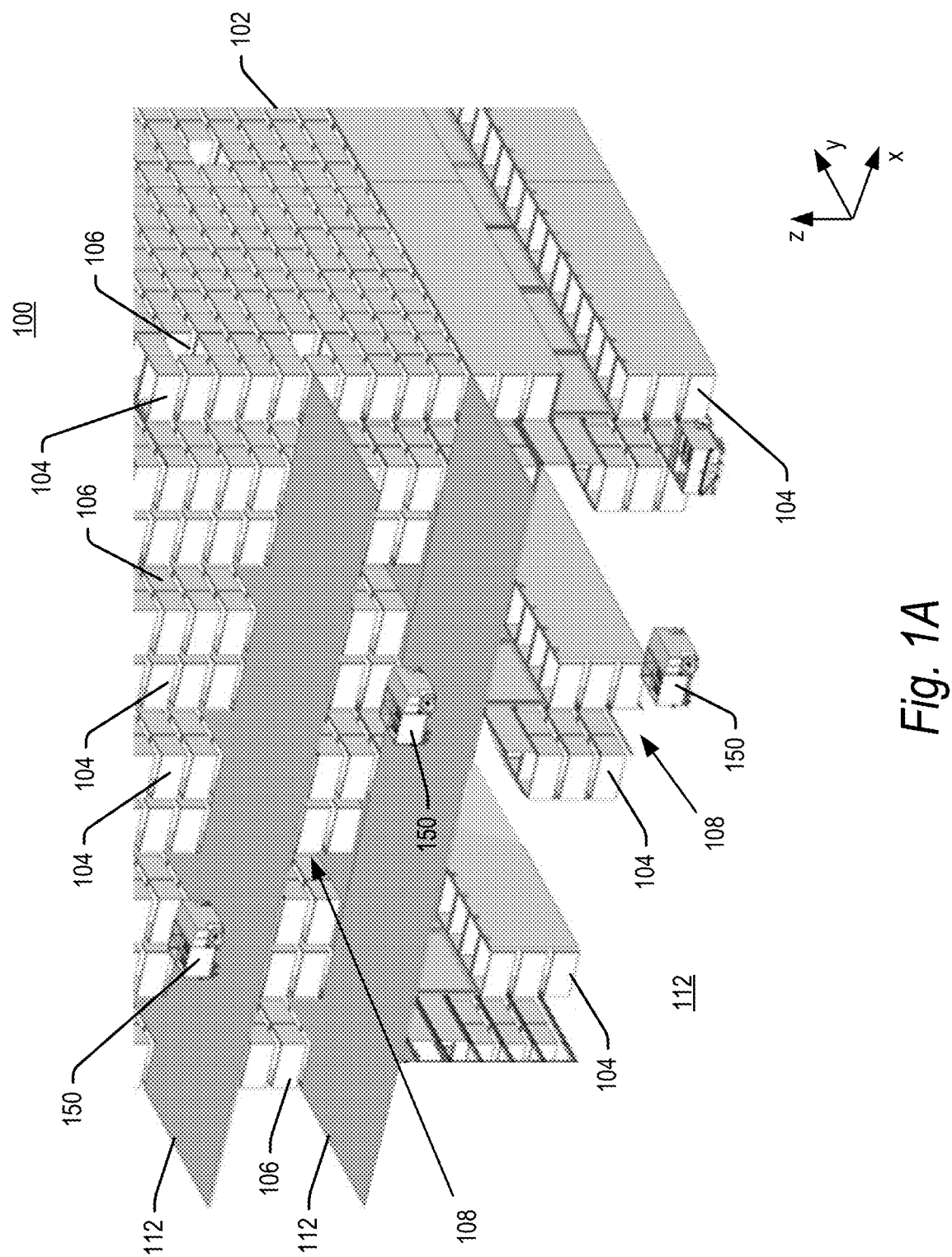
FIG. 1A is a perspective view of an order fulfillment facility according to embodiments of the present technology.

FIG. 1A shows a partial view of an embodiment of an order fulfillment facility 100 showing a storage structure 102 including a number of bays 104 of storage locations 106. In particular, each bay 104 includes a y-z array of storage locations 106 in horizontal rows and level changing towers along the rows which in embodiments may be vertical towers. As explained below, mobile robots 150 may travel between storage levels in the z-direction within the level changing towers. Pairs of bays 104 may be arranged to face each other, separated by aisles 108. An aisle 108 may have a width such that a mobile robot 150 traveling within an aisle 108 may transfer totes to the bays 104 on either side of the aisle 108. As explained hereinafter, the aisles may be wide enough for a human to enter into an aisle 108 between bays 104 to make repairs or otherwise service components within an aisle 108.

Figure 1B:
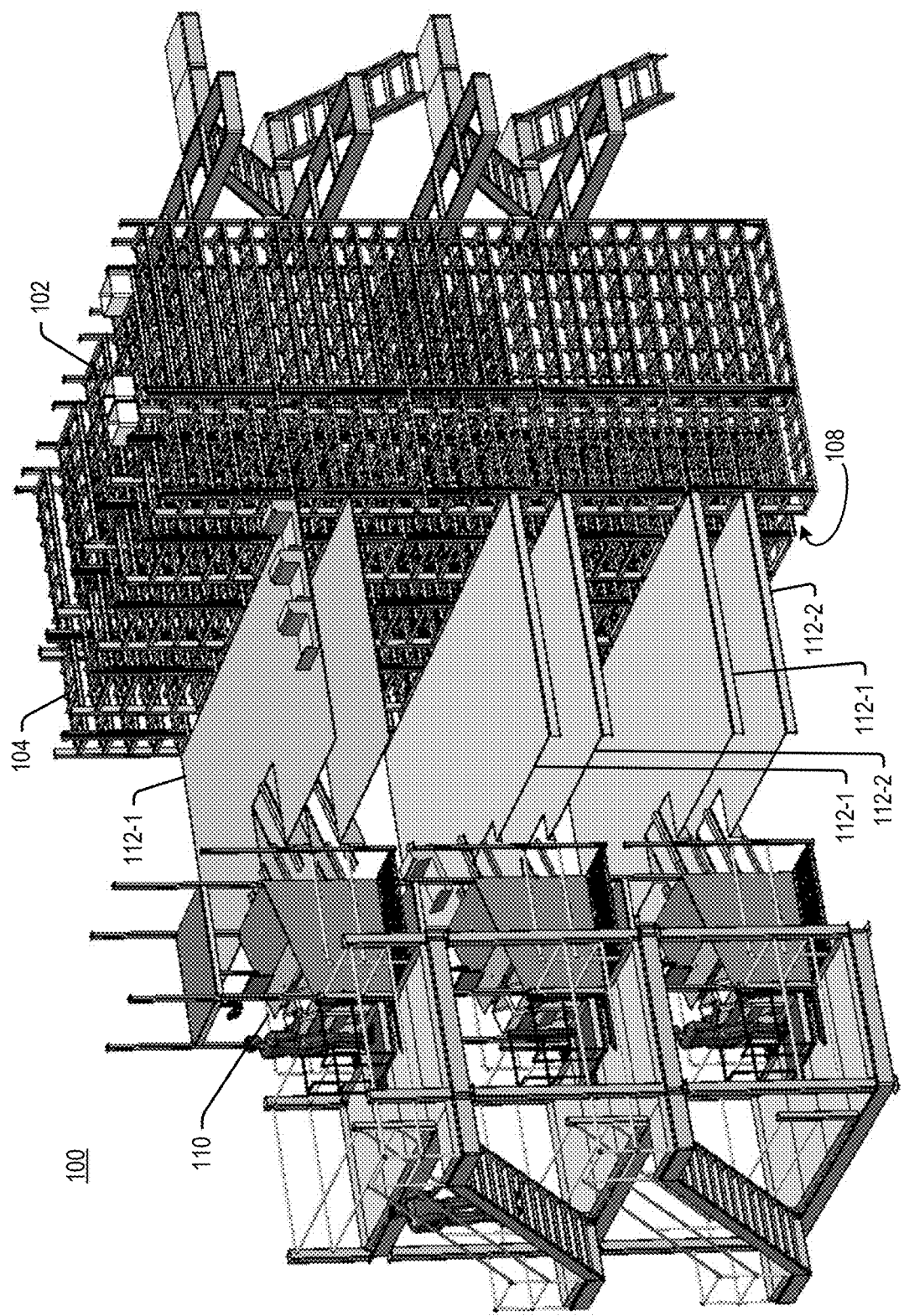
FIG. 1B is a perspective view of an order fulfillment facility with illustrated workstations according to embodiments of the present technology.

The order fulfillment facility 100 may further include decks 112 spaced apart at different horizontal levels of the storage structure 102. The decks 112 may extend between the aisles so that robots can maneuver in the x-y plane of each deck to travel between different aisles. The decks 112 also extend into the respective aisles to allow technicians to walk into an aisle 108 to service components within the aisle. In embodiments, the decks 112 may be vertically spaced apart from each other 5-8 feet, so that a technician can reach all areas within an aisle serviced by a particular deck. The spacing between decks may be different in further embodiments. For example, FIG. 1B shows multiple pairs of decks 112, with each deck in a pair of decks separated by a spacing of about two feet. This spacing may be greater or lesser than two feet in further embodiments. In addition to providing access to the aisles 108, each pair of decks transfers mobile robots to/from a workstation 110. In particular, mobile robots may come to a workstation from a first deck 112-1, and mobile robots may exit a workstation from a second deck 112-2. Mobile robots may come to a workstation from deck 112-2, and exit from first deck 112-1, in further embodiments.

FIG. 1B also shows examples of workstations 110. In embodiments, each workstation is equipped to receive a pair of mobile robots. A first mobile robot at a station carries product totes, with items for fulfilling product requests. A second mobile robot at the station carries order totes, within which items from the product totes are placed to fulfill product requests. Workers at a workstation manually transfer items from a product tote to an order tote under guidance of an inventory control system at the workstation.

The mobile robots for both the product and order totes arrive from one of the decks, for example deck 112-1. Once items are transferred from the product totes to the order totes, the mobile robots may depart the workstation, for example via deck 112-2. Mobile robots carrying product and order totes continuously cycle through the workstations 110. Although omitted from FIG. 1A, workstations 110 may also be included in that embodiment. In FIG. 1A, each workstation is serviced by a single deck 112, which serves as the entry to, and exit from, the workstation 110. A detailed explanation of the workstations 110 is beyond the scope of the present technology, but further details relating to the structure and operation of embodiments of the workstations are disclosed in U.S. Published Patent Application No. 2017/0137223, to John Lert and William Fosnight, entitled "Automated System for Transporting Payloads," filed on Jan. 31, 2017; and U.S. patent application Ser. No. 15/591, 956, to John Lert and William Fosnight, entitled, "Order Fulfillment System," filed on May 10, 2017. These applications are incorporated by reference herein in their entirety. For the purposes of the present technology, it is conceivable that some malfunction may occur at a workstation 110 which would require service as explained below.

As noted above, the order fulfillment facility 100 may further include a number of mobile robots 150 for transferring totes or other product containers to and from workstations 110 and storage locations 106 in the bays 104. In embodiments, mobile robots 150 may be self-guided so as to move horizontally and vertically within aisles 108 to transfer totes or other product containers between the mobile robots 150 and storage locations 106. For example, a track system including horizontal rails may be affixed to bays 104 within an aisle 108 at different vertical levels. The horizontal rails provide access to storage shelves on either side of an aisle 108 in the x-direction on a given level. As noted above, the bays 104 may include level changing towers within which the mobile robots may travel vertically in the z-direction between levels of storage locations 106.

The decks 112 allow inter-aisle travel of mobile robots 150 at different levels of the storage structure 102. As noted above, the decks 112 may extend into the different aisles 108. The decks 112 may be provided with openings in the deck flooring at the level changing towers. The openings allow mobile robots moving vertically between levels in an aisle 108 to pass through one or more decks 112 within the aisle.

Further details of a storage structure, track system and mobile robot which may be used in conjunction with the present technology are described for example in the following U.S. patents and patent applications: U.S. Pat. No. 9,139,363, to John Lert, entitled "Automated System For Transporting Payloads," issued Sep. 22, 2015; U.S. Patent Application Publication No. 2016/0355337, to John Lert and William Fosnight, entitled, "Storage and Retrieval System," filed on Jun. 2, 2016; and previously mentioned U.S. patent application Ser. No. 15/591,956, to John Lert and William Fosnight, entitled, "Order Fulfillment System," filed on May 10, 2017. Each of these patents and applications are incorporated by reference herein in their entirety.

Figure 2:
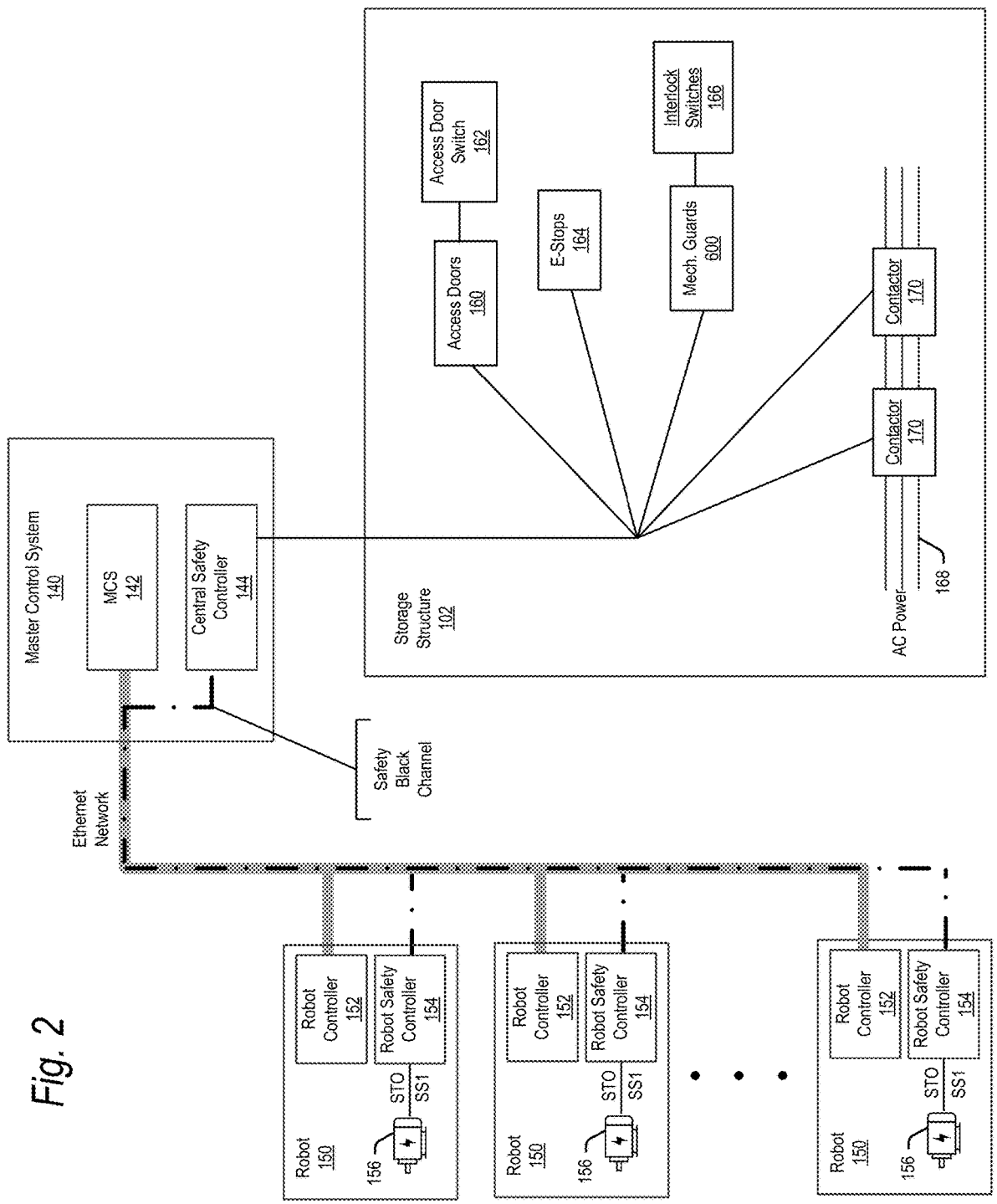
FIG. 2 is a block diagram of safety components for an embodiment of the present technology.

The overall control system for the order fulfillment facility 100 will now be explained with reference to the block diagram of FIG. 2. The order fulfillment facility 100 may include a master control system 140 for controlling a variety of operations within the facility 100. For example, the master control system 140 may implement the MCS 142, which generates and wirelessly transmits destination and travel route information to a robot controller 152 within each of the mobile robots 150. FIG. 2 schematically shows three mobile robots 150, but there may in fact be many more.

The master control system 140 may further include a central safety controller 144, which transmits a periodic enabling message, also known as a heartbeat, to safety-rated controllers 154 on each robot 150. The wireless heartbeat may be an encrypted signal sent to each mobile robot periodically, such as for example every few seconds, using a standard wireless Ethernet network via black-channel communication (this is commercially available technology defined by the IEC 61784-3 standard). If a wireless heartbeat is received, it is decrypted and verified. The identifier may be checked to confirm it is the next expected identifier in the sequence, and the wireless heartbeat may be checked for data corruption.

If ever the safety controller 154 within a mobile robot 150 fails to receive the wireless heartbeat, the verification process fails, or the controller 154 receives a "halt" message from the central safety controller 144, the robot safety controller 154 automatically immobilizes the mobile robot 150. In particular, robot safety controller 154 is coupled to a controller for the robot locomotion motor 156. If anything other than a normal operations heartbeat is received by the robot safety controller 154, the robot safety controller shuts down the robot motor 156 by executing a Category 0 stop (safe torque off) or Category 1 stop (safe stop 1) in accordance with IEC 60204-1. In the execution of certain safety protocols, explained in greater detail below, the halt message sent by the central safety controller 144 may be global, i.e. it is sent to all robots, and has the effect of stopping motion of all robots 150 in the order fulfillment facility 100.

The central safety controller 144 in turn monitors several subsystems within the order fulfillment facility 100 to ensure safe operating conditions within the facility 100. For example, the facility 100 may include one or more access doors 160 providing access to the storage structure 102, decks 112 or other areas where mobile robots 150 may travel. Each door 160 may include a safety rated switch 162 coupled to the central safety controller 144 so that the central safety controller can determine whether each door is opened or safely closed. The workstations 110 and possibly other locations may be equipped with emergency stop (e-stop) button 164 allowing technicians to signal the central safety controller 144 to send a halt or other stop signal to the robot safety controllers 154.

As explained in greater detail below, aspects of the present technology relate to closing off access points to a dynamically configurable service zone using mechanical guards. Each of those guards may include a safety rated interlock switch 166 coupled to the central safety controller 144 so that the central safety controller can determine which mechanical guards are opened and which are securely closed over an access point. It is possible that the central safety controller 144 send a normal operations heartbeat to the mobile robots 150 even though one or more access doors 160 are open and one or more mechanical guards are open. In particular, the central safety controller 144 may send a normal operations heartbeat where it determines that a group of mechanical guards are closed so as to define an isolated service zone with access points blocked by mechanical guards. This feature is explained in greater detail below.

Additionally, the storage area 102 may include powered rails 168 which may be used to charge the power supply of the mobile robots 150 as they move around the storage area 102. The central safety controller 144 may further monitor a voltage through rails 168 through contactors 170, both to determine when the rails are receiving a voltage, and to send a power shutoff signal to shut off the voltage to at least a section of the rails 168 when the controller 144 determines an access door 160 providing access to the section of rails is open.

Aspects of the present technology relate to a failsafe safety system for servicing areas of the order fulfillment facility 100 including a reconfigurable system of mechanical guards working in combination with the central safety controller 144 of the control system. The central safety controller 144 may be implemented in software and/or hardware, and may control the execution of different safety protocols. The particular safety protocol which is used in a given situation may depend on the determined priority level of service needed and/or the estimated length of the service task within the order fulfillment facility 100.

For low priority service tasks (short or lengthy), the central safety controller 144 may implement a service protocol, under which the facility continues to operate as normal, avoiding the failed mobile robot, failed structural element or area requiring service. In particular, under the service protocol, the central safety controller 144 receives an indication from a technician of component or area requiring service, and the central safety controller 144 communicates with the MCS to reroute mobile robot traffic to avoid that area.

Upon completion of all tasks, for example at the end of the day, operations cease and the system is shutdown as it normally would be. At that time, service to the affected component or area is conducted. Whether a service task is deemed a low priority service task (as opposed to a high priority service task explained below) may be a judgment call made by a facility technician, and may vary in different embodiments. It is also possible that the central safety controller 144 may make this determination based on a set of rules and a variety of objective criteria, including for example the ease with which the area needing service may be avoided without interrupting normal operations. While low priority tasks may be handled by the service protocol as described above, low priority tasks may alternatively be handled by the first or second safety protocols which are described in the following paragraphs.

A component may have malfunctioned or an area may be damaged in a way such that waiting until cessation of normal operations to perform the service task will adversely impact the operation and/or productivity of the facility. Such service tasks may be considered high priority service tasks. For high priority service tasks, normal operations in the facility are briefly shut down, the repair is performed, and system operations resume as explained below. As used herein, there are two types of high priority service tasks: service tasks which may be performed quickly, and service tasks which will take more time to perform. The present technology may implement a first safety protocol for high priority service tasks which may be performed quickly, and a second safety protocol for high priority service tasks which will take more time to perform.

A quick, high priority service task may for example include removing a malfunctioning mobile robot in a high traffic area which affects facility operation, a tote dislodged from a shelf in a high traffic area which affects facility operation, or other service task which affects facility operation but can be quickly remedied. In one example, service tasks which will take less than 5 or 10 minutes to perform may be considered a quick service task performed under the first safety protocol. Those service tasks taking more than 5 or 10 minutes may be performed under the second safety protocol. However, it is understood that the length of time which defines the threshold between quick service tasks performed under the first safety protocol and the more lengthy service tasks performed under the second safety protocol may be defined differently in different order fulfillment facilities 100, and may vary in different embodiments.

Figure 3:
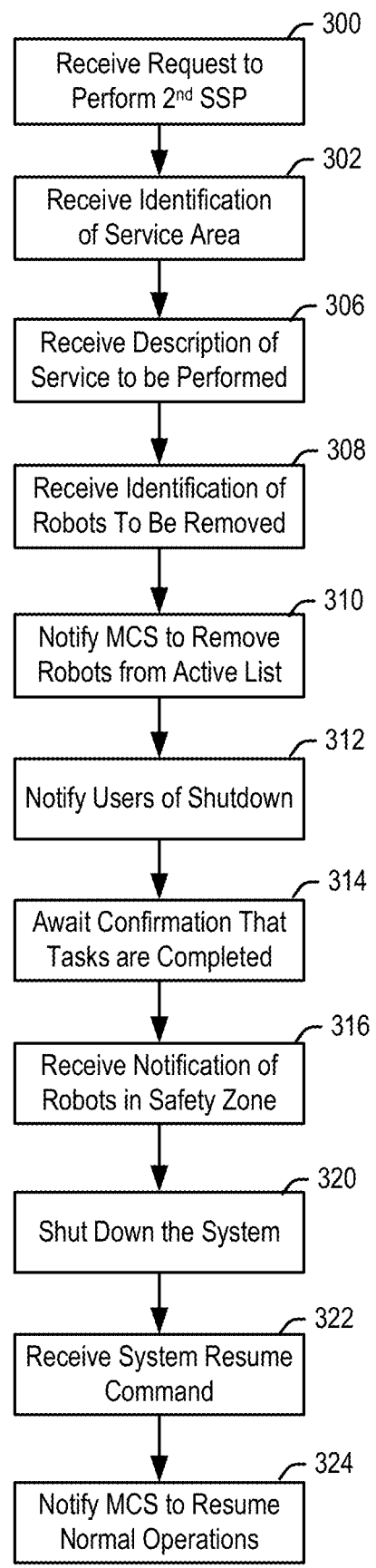
FIG. 3 is a flowchart showing the steps in an embodiment of a safety protocol.

An embodiment of the first safety protocol for quick, high priority service tasks will now be described with reference to the flowchart of FIG. 3. In FIG. 3, a determination has been made that the service required will be shorter than some predefined threshold, and the first safety protocol is to be used. This determination may be made by a technician. Alternatively, the central safety controller 144 may make this determination based on a set of rules and a variety of objective criteria, including for example known service times for certain service tasks, or an estimated service time manually input by the technician.

In step 300, the central safety controller 144 may receive a request to perform the first safety protocol as result of a technician sending a notification. For example, the technician may log into a terminal and request the first safety protocol via a user interface for the central safety controller 144 presented on a display of the terminal. In step 302, the central safety controller 144 receives an identification from the technician of the area(s) to be cleared of mobile robots for service. In a further embodiment, instead of a notification from a technician, the MCS 142 may identify a malfunctioning robot and its location, and automatically notify the central safety controller 144 of this malfunction and location. In step 306, the central safety controller 144 may receive a description of the service to be performed from the technician or MCS 142, and the approximate duration for the service task. In step 308, the central safety controller 144 receives an identification of any mobile robots that the technician knows are going to be removed from operation during service.

In step 310, the central safety controller 144 notifies the MCS 142 to remove any/all mobile robots from the zone to be serviced from the list of active mobile robots. In step 312 the central safety controller 144 may send a notification to all users (for example through GUIs at the workstations 110) that the system is about to be shut down. Shutdown primarily entails immobilization of all of the mobile robots 150. Shutdown may also entail removal of power to any powered rails 168, should they exist in the service area or order fulfillment facility 100 in general.

In step 314, the central safety controller 144 awaits confirmation from the MCS 142 that pending tasks and orders have been completed, and that functional robots have been removed from the zone to be serviced. These tasks and orders can include completion of any initiated tote transfers to/from the workstations 110 or storage locations 106. These tasks/orders may further include returning refrigerated or frozen items to their climate-controlled storage areas. Return of items to climate-controlled storage areas may be skipped under the first safety protocol. These tasks/orders may further include returning all operational mobile robots 150 to designated storage areas (outside of the area to be serviced). In step 316, the central safety controller 144 may additionally receive notification from the MCS as to which mobile robots (if any) are still in the service zone(s).

Once the above steps have been performed, the central safety controller 144 shuts down the system in step 320. In embodiments, shut down of the system may include at least immobilization of all mobile robots within the storage facility, or at least immobilization of all mobile robots which can travel to the service zone. In order to immobilize the mobile robots, the central safety controller 144 may change the heartbeat message from normal operations to a halt signal, or some other stop signal may be sent in place of the normal operations heartbeat. The halt or stop signal may be communicated to all mobile robots in operation in the order fulfillment facility 100.

Once shutdown is complete, the central safety controller 144 unlocks access doors(s) 160 allowing technician access to the service area. Opening of a service access door may ordinarily cause shutdown of operations in the order fulfillment facility 100. Thus, in embodiments, shutdown of the system may be affected this way, instead of manual instruction from the technician as described above. The technician entering the zone may lock the service access door(s) open. All mobile robots have been deactivated so there is no danger of collision or injury.

Once the service task has been completed, the technician may exit the service area, closing any service access doors. The technician may then input a system resume command via the user interface in step 322. In step 324, the central safety controller 144 may notify the MCS 142 to resume normal operations.

The above-described steps in the first safety protocol are by way of example only. It is understood that one or more of the above-describe steps may be omitted, performed in a different order or supplemented with additional steps in further embodiments.

An important distinction between the first and second safety protocols is that, under the second safety protocol, a service zone is physically isolated and then facility operations resume around the service zone. In particular, for lengthy repairs, it would not be efficacious to keep the entire facility down while the lengthy repair is performed. Therefore, in accordance with the second safety protocol, the technician sets up a physical perimeter around a zone where service is to be performed using mechanical guards. Once the perimeter is set up, normal operations of the mobile robots and order fulfillment facility may resume, but with the mobile robots physically restrained against entry into the service zone. Further details of an embodiment of the second safety protocol for longer, high priority service tasks will now be described with reference to the flowchart of FIGS. 4A and 4B.

Figure 4A:
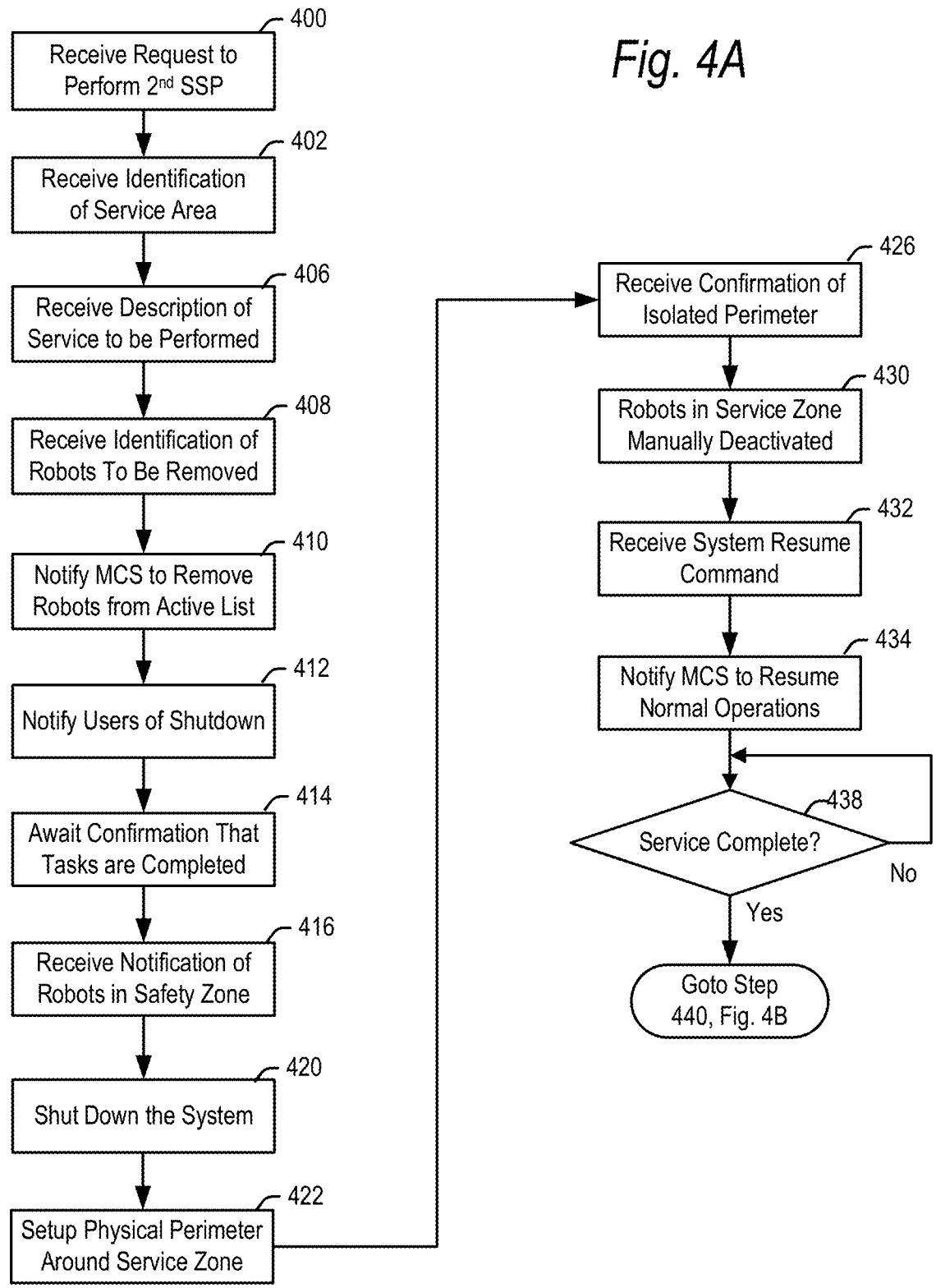
FIGS. 4A and 4B illustrate a flowchart showing the steps in a further embodiment of a safety protocol.
Figure 4B:
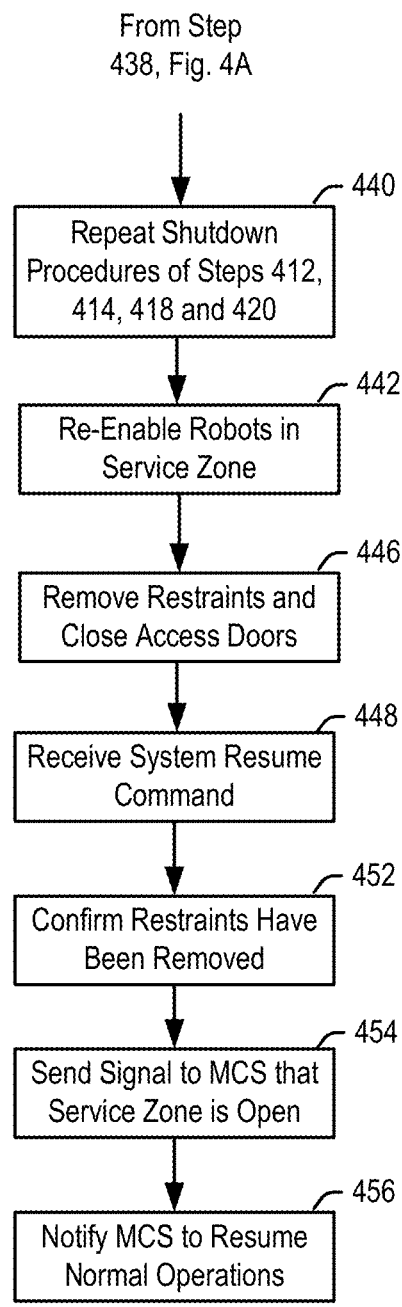

In FIGS. 4A and 4B, a determination has been made that the service required will be longer than some predefined threshold, and the second safety protocol is to be used. As noted above, this determination may be made by a technician. Alternatively, the central safety controller 144 may make this determination based on a set of rules and a variety of objective criteria, including for example known service times for certain service tasks, or an estimated service time manually input by the technician.

In step 400, the central safety controller 144 may receive a request to perform the second safety protocol as result of a technician sending a notification. As described above, in one example, the technician may log into a terminal and request the second safety protocol via the user interface for the central safety controller 144 presented on a display of the terminal. It is possible that this notification be automatically generated by the MCS 142 in further embodiments. In step 402, the central safety controller 144 receives an identification of the area(s) to be cleared of mobile robots for service from the technician or MCS 142. In step 406, the central safety controller 144 receives a description of the service to be performed, and the approximate duration, from the technician, and in step 408, the central safety controller 144 receives an identification of any mobile robots that the technician knows are going to be removed from operation during service.

In step 410, the central safety controller 144 notifies the MCS to remove any/all mobile robots to be serviced from the list of active mobile robots. In step 412 the central safety controller 144 may send a notification to all users (for example through GUIs at the workstations 110) that the system is about to be shut down.

In step 414, the central safety controller 144 awaits confirmation from the MCS 142 that pending tasks and orders have been completed. These tasks and orders can include completion of any initiated tote transfers to/from the workstations 110 and storage locations 106. These tasks/orders may further include returning refrigerated or frozen items to their climate-controlled storage areas. These tasks/orders may further include returning all operational mobile robots 150 to designated storage areas (outside of the area to be serviced). In step 416, central safety controller 144 may additionally receive notification from the MCS as to which mobile robots (if any) are still in the service zones.

Once the above steps have been performed, the central safety controller 144 may shut down the system in step 420. In order to immobilize the mobile robots, the central safety controller 144 may change the heartbeat message from normal operations to a halt signal, or some other stop signal may be sent in place of the normal operations heartbeat. The halt or stop signal may be communicated to all mobile robots in operation in the order fulfillment facility 100.

Once the shutdown is completed, the door is unlocked, allowing a technician to enter the zone. As noted above, opening of a service access door may be the event which causes shutdown of operations in the order fulfillment facility 100 instead of manual instruction from the technician as described above. The technician entering the zone may lock the service access door open. All mobile robots have been deactivated at this point so there is no danger of collision or injury.

In accordance with embodiments of the second safety protocol, a technician may next set up a physical perimeter in step 422 around a service zone using mechanical guards as described below. The mechanical guards may include PLCs which communicate with the central safety controller 144 in the control system to confirm in step 426 when a completely isolated perimeter has been established around a service zone. In embodiments, the mechanical guards may be manually closed by technicians from within the zone. In further embodiments, the mechanical guards may be automatically opened or closed, and the physical perimeter around an isolated zone may be set up by instructions provided remotely to the central safety controller 144.

In step 430, the technician may manually deactivate any mobile robots remaining within the isolated service zone, for example by switching off a power button on the mobile robots.

Once the central safety controller 144 confirms an isolated perimeter has been set up and that all mobile robots within the service zone are disabled, the central safety controller 144 looks for a system resume signal from the technician in step 432. In particular, once the mechanical guards are in place and any mobile robots within the service zone are disabled, the technician may send a notification to the control system to re-enable operation of the system either wirelessly or by logging into a terminal. Thereafter, the central safety controller 144 may notify the MCS in step 434 and normal operations within the order fulfillment facility 100 resume, with the exception that mobile robots are physically prevented from entering the isolated service zone. Thus, the safety of the technician within the service zone is ensured as the mobile robots 150 move around outside of the service zone.

It is possible that one or more access doors 160 and/or mechanical guards are open when the normal operations resume in step 434. In particular, as long as the central safety controller 144 is able to confirm that a group of mechanical guards are closed so as to define an isolated service zone, normal operations may resume in a perimeter around the isolated service zone in step 434.

The central safety controller 144 awaits a confirmation from the technician in step 438 that the service is completed. Once the service task has been completed, the technician may reinstitute a facility shutdown in step 440 (FIG. 4B). The process may repeat the shutdown procedure as described above in steps 412 (notify users of shutdown), 414 (await confirmation that pending tasks are completed) and 420 (shut down the system).

After shutdown in step 440, to the extent the technician may have manually disabled any mobile robots within the service zone, those mobile robots may be re-enabled in step 442 (though they remain inactive due to the facility-wide shutdown of operations). The technician may next remove/open the mechanical guards and exit the service area in step 446, and close all service access doors. In step 448, the central safety controller 144 looks for the system resume notification from the technician, once the technician has exited and closed any service access doors. The central safety controller 144 may confirm in step 452 that the mechanical guards from the service zone have been removed, and send a signal in step 454 to the MCS 142 that the service zone is now accessible for mobile robot travel. Assuming service access doors are properly closed, the central safety controller 144 may send a signal to the MCS to resume operations in step 456.

The above-described steps in the second safety protocol are by way of example only. It is understood that one or more of the above-describe steps may be omitted, performed in a different order or supplemented with additional steps in further embodiments.

In the implementation of the second safety protocol, it may happen that a particular tote, storage shelf or storage area becomes unavailable during service of an isolated zone. Therefore, the MCS 142 may ensure that items of a particular SKU are stored in more than one location in the storage structure 102. The MCS 142 may further employ rules to make sure that totes are purposely stored in disparate zones. This allows order fulfillment to continue when for example a bot is stranded in front of one or more totes, or a whole zone is taken down for service.

In accordance with aspects of the present technology, the mechanical guards may be variably configured to define service zones of different sizes and at different locations. One example of a service zone 500 is illustrated as a shaded area in FIG. 5. This example illustrates a mobile robot 150 which has become dislodged from the horizontal and vertical rails on which it would ordinarily travel. It is understood that a wide variety of other situations may occur which require service within the zone 500. In the example shown, the service zone 500 is within an aisle 108 in the storage structure 102. The storage locations 106 on either side of aisle 108 are omitted from FIG. 5, but the track system of horizontal and vertical rails is shown. As indicated by the break, the aisle 108 may be longer than is shown in FIG. 5.

Figure 5:
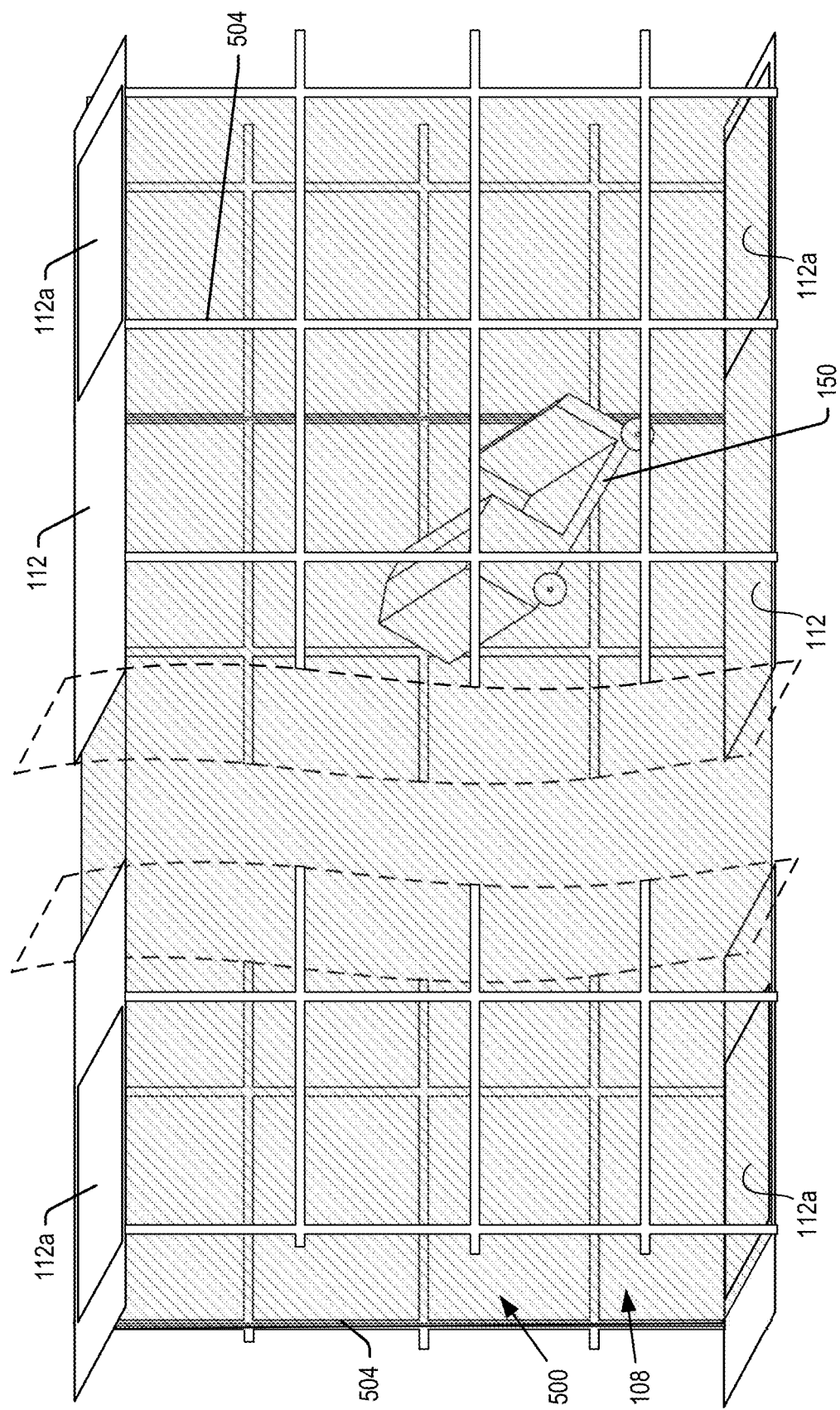
FIG. 5 shows an example of a service zone within the order fulfillment facility where a technician is to perform repairs or other service.

FIG. 5 also shows a pair of decks 112. The decks may be separated from each other at least by a height sufficient to allow a technician to enter into the zone 500 and walk along a deck 112 to perform a service task. As noted above, the decks 112 may include openings (112a) at the level changing towers 504.

Figure 6:
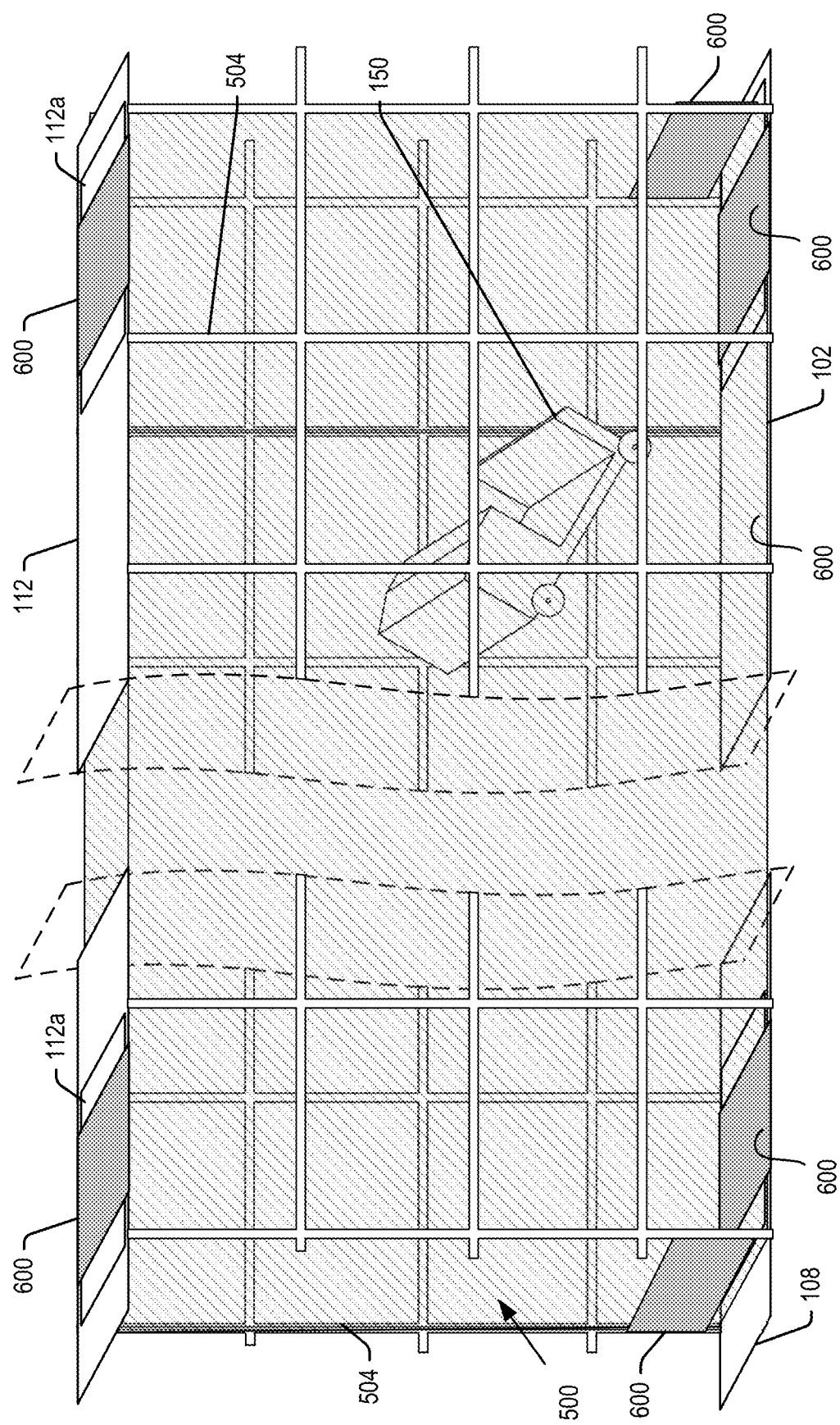
FIG. 6 shows mechanical guards isolating the service zone shown in FIG. 6.

FIG. 6 illustrates mechanical guards 600 which may be applied around the perimeter of service zone 500 to physically isolate the service zone 500 from entry of mobile robots moving around the storage structure 102. In the example shown, there are two level changing towers 504, and the decks 112 each include an opening 112a through which mobile robots 150 may pass when moving vertically in the level changing towers 504. In order to physically seal the service zone 500 from entry of mobile robots 150 through the level changing towers 504, horizontally oriented mechanical guards 600 may be provided to cover at least a portion of each of the openings 112a in the decks 112 within the level changing towers 504.

In the example shown, there are two level changing towers 504, so there are a total of four horizontally oriented mechanical guards 600, two for each of the level changing towers to seal the level changing towers at the top and bottom of the service zone 500. There would be additional horizontally oriented mechanical guards if they were more than two level changing towers providing access to the service zone 500.

In embodiments, the mechanical guards 600 covering the openings 112a may be 0.25 inch thick steel plates. However, it is understood that the mechanical guards may be formed of a wide variety of other materials and to other thicknesses, with the provision that the mechanical guards be of sufficient thickness and strength to prevent entry of a mobile robot 150 attempting to pass into the service zone 500 through the mechanical guards 600. Instead of flat plates, the mechanical guards 600 may be formed of materials having other shapes, such as for example cylindrical rods or chains. The mechanical guards 600 may cover a portion of the openings 112a, or all of the openings 112a.

The mechanical guards 600 may be fastened in position over the openings 112a using any of a wide variety of removable or retractable fasteners. For example, mechanical guards 600 may include retractable latches that engage within portions of the decks 112 to lock the mechanical guards in position over the openings 112a. The mechanical guards 600 in this example may be removed from the openings 112a by manually retracting the latches (using for example a handle) from their engagement with decks 112. In embodiments, one side of the mechanical guard may be attached at an edge of an opening 112a, as by a hinge, so that a mechanical guard may be swung from an open to a closed position over the opening 112a when needed. In further embodiments, a mechanical guard 600 may be stored beneath or within the deck 112 so as to slide out to a closed position over the opening 112a when needed. In further embodiments, mechanical guards 600 may be carried from a remote location and affixed over the openings 112a when needed. The mechanical guards 600 may be manually opened and closed, but it is conceivable that the mechanical guards be automated in further embodiments as mentioned above.

With each of the openings 112a within level changing towers 504 covered by horizontally oriented mechanical guards 600, the only other possible access point of a mobile robot 150 into service zone 500 in FIG. 6 is horizontally along the bottom deck 112. Accordingly, vertically oriented mechanical guards 600 may also be provided to block horizontal entry of a mobile robot 150 into the service zone 500 at the level of the bottom deck 112. In the embodiment shown, deck 112 extends out of both the front and rear ends of aisle 108. Accordingly, vertically oriented mechanical guards 600 may be provided at the front and rear of the service zone 500 as shown. If the deck 112 extended from only one end of an aisle 108, only one vertically oriented mechanical guard would be required.

Aside from their orientation, the vertically oriented mechanical guards 600 may be the same as the horizontally oriented mechanical guards 600. The vertically oriented mechanical guards 600 may be formed of the same or different materials as the horizontally oriented mechanical guards. The vertically oriented mechanical guards 600 may be affixed to the track systems on either side of aisle 108 in the same or different manner that the horizontally oriented mechanical guards 600 may be affixed within the openings 112a.

As shown in FIG. 6, the six mechanical guards 600 block all access points for mobile robots into the service zone 500. Thus, when the six mechanical guards 600 are in position as shown in FIG. 6, the service zone 500 is isolated against robot entry, and a technician may enter the isolated zone to perform service (in this example, to the malfunctioning mobile robot 150) without possibility of injury from a moving robot 150. The mechanical guards 600 provide a failsafe safety system within the service zone 500, without having to know the locality of the mobile robots within the order fulfillment facility 100.

In embodiments, each of the mechanical guards 600 may include a safety rated interlock switch 166, as described above with respect to FIG. 3. The interlock switches 166 may be capable of wired or wireless communication with the central safety control system as described above. In such embodiments, signals may be sent from each interlock switch 166 which its associated mechanical guard 600 is in position to block entry of a mobile robot into the service zone 500.

The height of a service zone may extend between two adjacent decks 112. The example shown in FIGS. 5 and 6 includes four levels between the top and bottom decks 112. As noted, the top and bottom decks may be spaced approximately 5 to 8 feet from each other (though it may be smaller or larger than this). In such an embodiment, it may be desirable to include all four levels, i.e., the entire distance between the top and bottom decks 112, within the service zone 500.

Where the spacing between decks is large, for example greater than 8 feet, it is conceivable that the horizontally oriented mechanical guards 600 be horizontally positioned within the level changing towers 504 on the track system instead of over the openings 112a in decks 112. For example, in FIG. 6, the horizontally oriented mechanical guards 600 may be positioned on the track system one level down from the upper deck 112, within the level changing towers 504.

Figure 7:
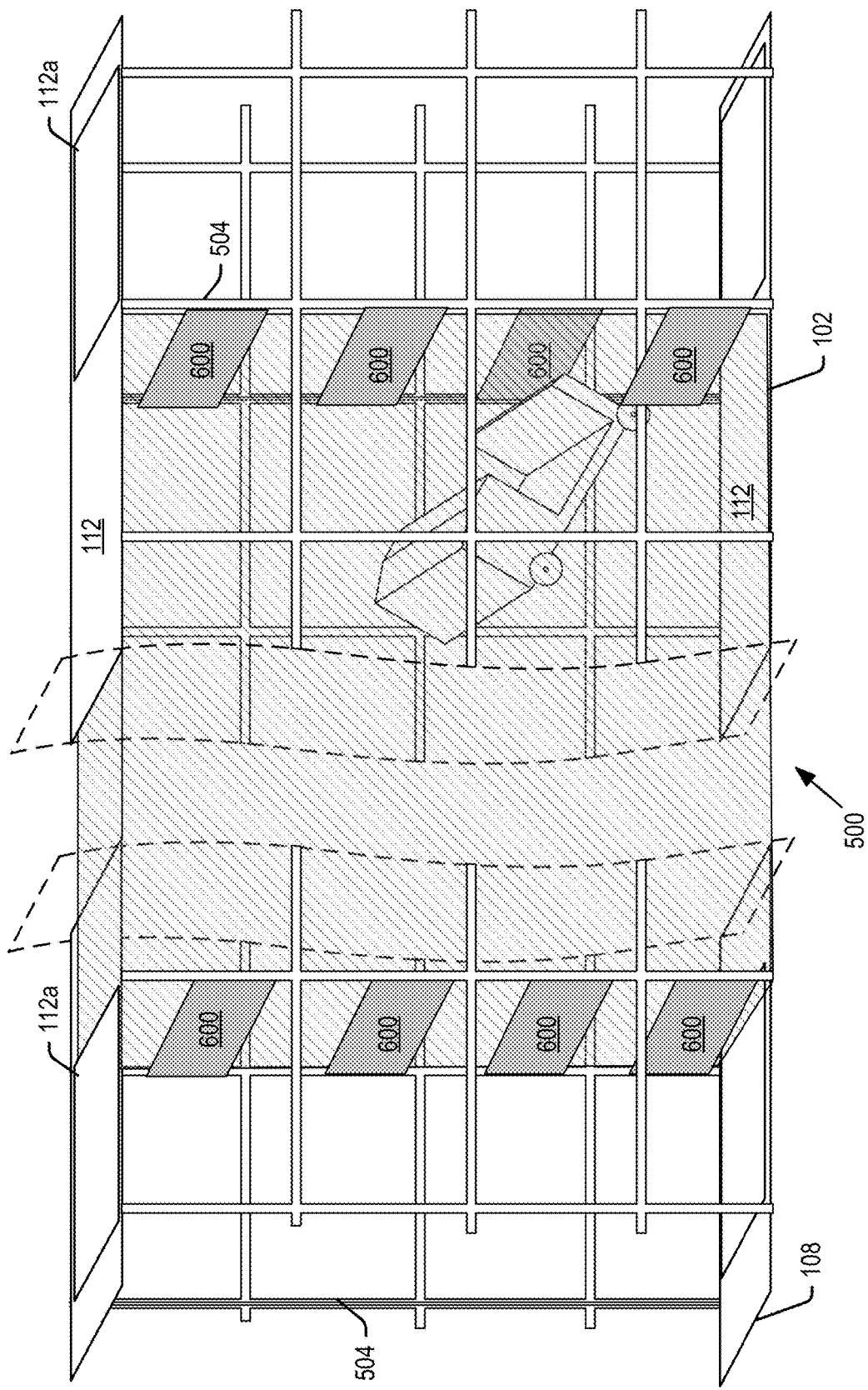
FIG. 7 shows an alternative configuration of mechanical guards isolating a service zone.

FIG. 7 illustrates a further example of an isolated service zone 500. In this example, mobile robots are free to move vertically within level changing towers 504 at either end of the service zone 500. Given that the open level changing towers allow a mobile robot 150 to enter any level between the top and bottom decks 112 shown in FIG. 7, each level may be sealed with a vertically oriented mechanical guard 600 as shown. As this example includes a pair of level changing towers which are open, mechanical guards 600 are provided at both ends of the service zone 500 to completely isolate the service zone 500 against entry of a mobile robot.

Figure 8:
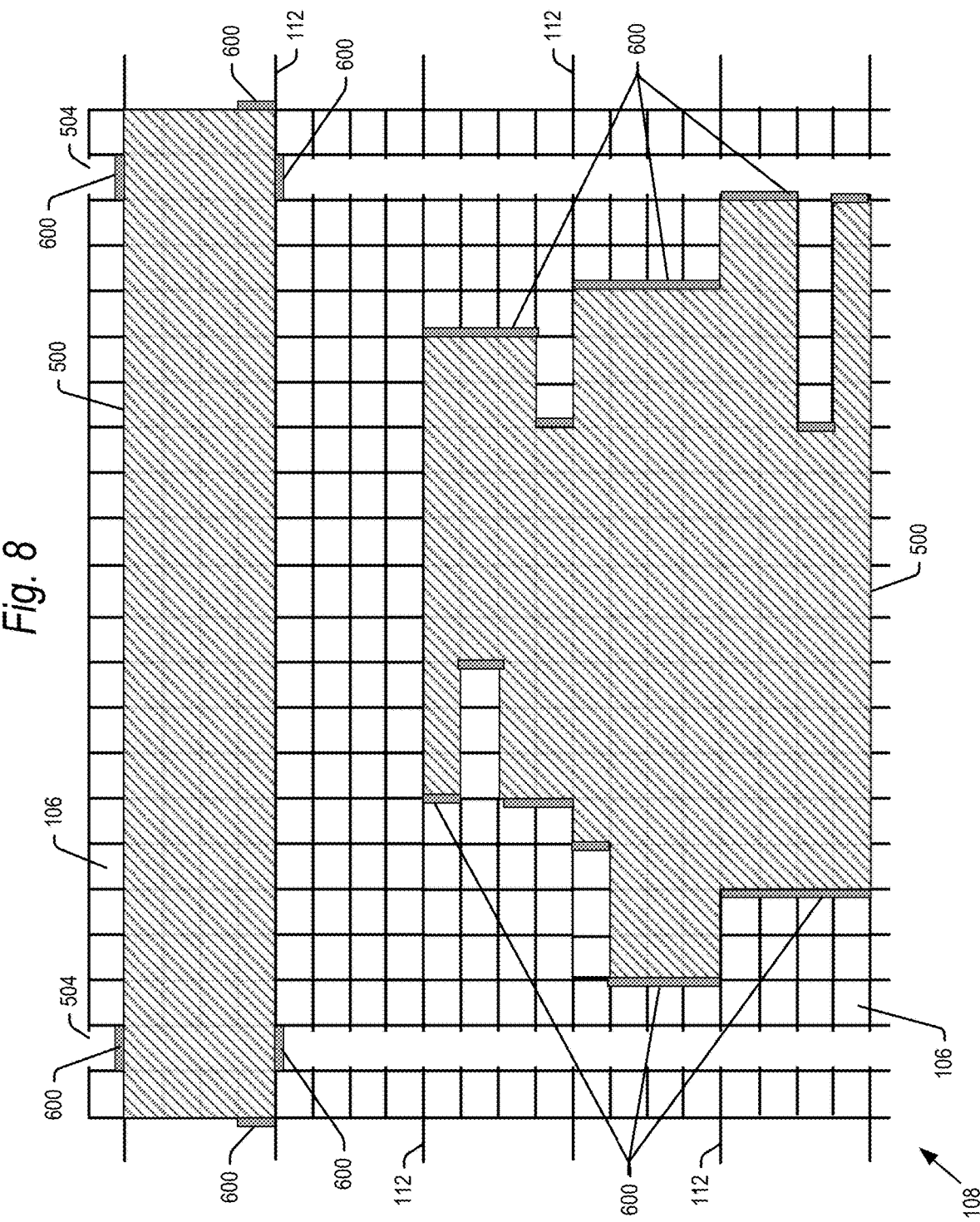
FIG. 8 shows a further alternative configuration of mechanical guards isolating multiple service zones.

FIGS. 5-7 illustrate a few examples of isolated service zones 500 which may be set up using mechanical guards 600. However, it is understood that isolated service zones 500 may be dynamically provided in a wide variety of other configurations, depending on the placement of the mechanical guards 600. FIG. 8 illustrates a cross-sectional view of an aisle 108 including storage locations 106 and decks 112 extending from either end of the aisle 108. The aisle 108 further includes level changing towers 504 at either end of the aisle 108.

FIG. 8 shows a first service zone 500 (at the top of the aisle 108) which may have a configuration similar to that shown for example in FIGS. 5-7. The first service zone 500 includes mechanical guards 600 as described above. The second service zone 500 spans multiple levels and decks, and may have different lengths at one or more levels. As each of the levels included within the second service zone 500 is open to the level changing towers 504 (so that mobile robots may enter from below the lowermost deck shown), each level may include a vertically oriented mechanical guard 600 at either end of the level. Such a service zone 500 may be unusual in practice, but is provided to illustrate aspects of the present technology. The service zones 500 define a perimeter (i.e., all areas shown without shading) within which normal operations may be carried out.

Figure 9:
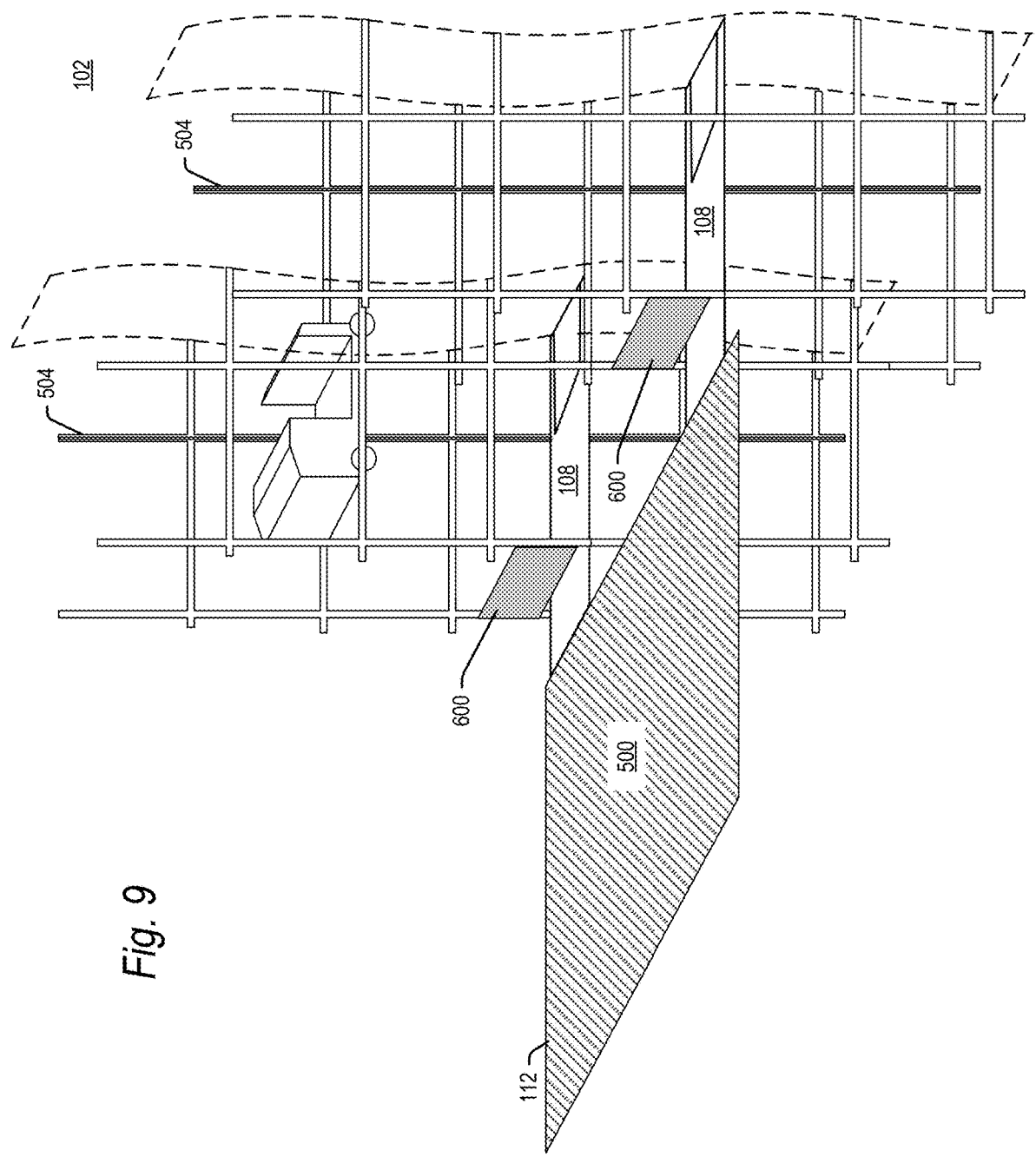
FIG. 9 shows a still further configuration of mechanical guards for isolating a service zone on a deck of the order fulfillment facility.

It is also conceivable that service needs to be performed on a component or area of a deck 112. FIG. 9 illustrates a further example where a deck 112 is provided as an isolated service zone 500. Before the mechanical guards are set up, all mobile robots may be removed from any workstations 110 on deck 112. As the only access to the deck 112/service zone 500 in the illustrated example is from the aisles 108, the deck 112/service zone 500 may be completely isolated by providing mechanical guards 600 blocking all access to the deck 112 from any aisle 108 within the storage structure 102. Thus, a technician may work within the service zone 500 on the deck 112 as mobile robots move along level changing towers 504 or along the horizontal rows of the storage structure 102 without the possibility of a mobile robot 150 entering the service zone 500 on the deck 112.

Figure 10:
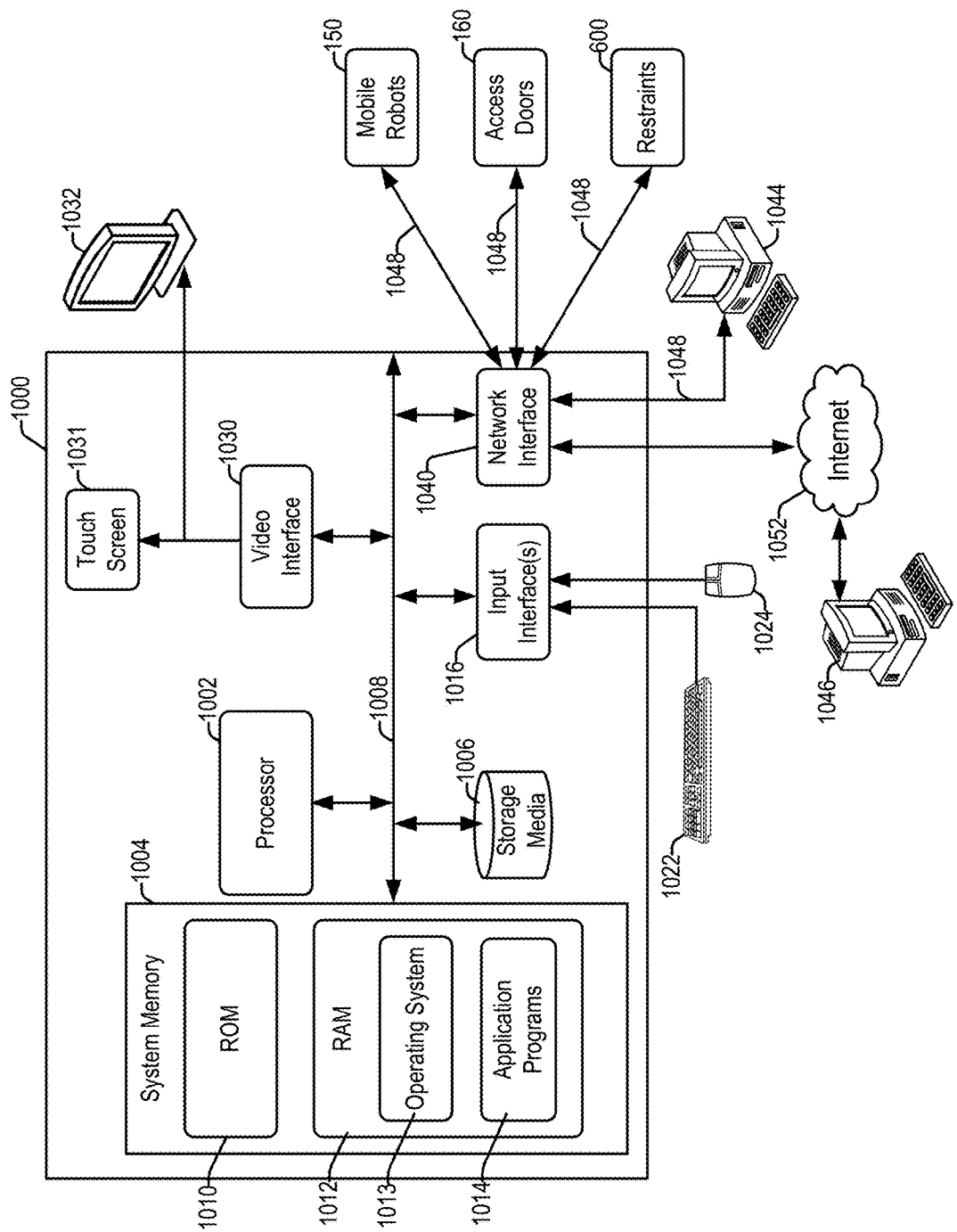
FIG. 10 is a block diagram of a computer system which may be used to implement aspects of the present technology.

FIG. 10 illustrates details of a computing device 1000, which may be used to implement the control system and the above-described MCS and central safety controller 144. Components of computing device 1000 may include, but are not limited to, one or more processors 1002, a system memory 1004, computer readable storage media 1006, various system interfaces and a system bus 1008 that couples various system components. The system bus 1008 may be any of several types of bus structures including a memory bus or memory controller, a peripheral bus, and a local bus using any of a variety of bus architectures.

The computing device 1000 may include computer readable media. Computer readable media can be any available tangible media that can be accessed by the computing device 1000 and includes both volatile and nonvolatile media, removable and non-removable media. Computer readable media does not include transitory, modulated or other transmitted data signals that are not contained in a tangible media. The system memory 1004 includes computer readable media in the form of volatile and/or nonvolatile memory such as ROM 1010 and RAM 1012. RAM 1012 may contain an operating system 1013 for computing device 1000. RAM 1012 may also execute one or more application programs 1014, including for example the MCS and central safety controller 144 described above. The computer readable media may also include storage media 1006, such as hard drives, optical drives and flash drives.

The computing device 1000 may include a variety of interfaces for the input and output of data and information. Input interface 1016 may receive data from different sources including touch (in the case of a touch sensitive screen), a mouse 1024 and/or keyboard 1022. A video interface 1030 may be provided for interfacing with a touchscreen 1031 and/or monitor 1032.

As explained above, the computing device 1000 may operate in a networked environment via a network interface 1040 using logical connections to one or more remote computers 1044, 1046, mobile robots 150, and the interlock and other switches. The computers 1044 may for example be terminals at the workstations and, optionally, throughout the order fulfillment facility 100. The computers 1046 may be one or more computers located outside of the order fulfillment facility 100.

The logical connections to computer 1044 and the interlock and other switches may be a wired and/or wireless local area connection (LAN) 1048. The logical connection to the remote computer 1046 may be via the Internet 1052. Other types of networked connections are possible, including broadband communications via mobile telephones. It is understood that the above description of computing device 1000 is by way of example only, and may include a wide variety of other components in addition to or instead of those described above.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for an order fulfillment facility comprising at least a two dimensional array of storage locations, a track system, and a deck at least adjacent the two dimensional array of storage locations, the system comprising:
    a plurality of mobile robots configured to move on the track system and around on the deck to perform order fulfillment operations at the storage locations; and
    a safety system, comprising:
    a plurality of zones within a space defined by at least one of the track system and deck; a plurality of mechanical guards mounted with respect to at least one of the track system and deck to define one of the zones of the plurality of zones as a service zone, the plurality of mechanical guards configured to prevent the mobile robots from entering the service zone; and
    a control system including one or more processors configured to prevent movement of the plurality of mobile robots throughout the order fulfillment facility while defining a perimeter of the service zone, the one or more processors further configured to:
    confirm when each access point in the service zone is sealed by a mechanical guard; and
    restart operation of at least some of the mobile robots outside of the service zone upon confirmation that each access point to the service zone is sealed.

2. The safety system of claim 1, wherein each of the plurality of mechanical guards is configured to send a signal to the control system when each of the mechanical guards is secured over an access point into the service zone.

3. The safety system of claim 2, wherein each of the mechanical guards of the plurality of mechanical guards comprises a safety rated switch for generating the signal.

4. The safety system of claim 1, wherein the size of the service zone is variably configurable depending on the positions of the mechanical guards in the space.

5. The safety system of claim 1, wherein the plurality of mechanical guards comprise vertically oriented mechanical guards mounted to the track system preventing horizontal movement of the mobile robots along the track system into the service zone.

6. The safety system of claim 1, wherein the plurality of mechanical guards comprise horizontally oriented mechanical guards mounted to the track system preventing vertical movement of the mobile robots along the track system into the service zone.

7. The safety system of claim 1, wherein the deck includes an opening configured to allow vertical travel of the mobile robots through the deck, the plurality of mechanical guards comprising a horizontally oriented mechanical guard mounted over the opening of the deck to prevent vertical movement of the mobile robots through the deck into the service zone.

8. The safety system of claim 1, wherein the service zone is located on a deck around the two dimensional array of storage locations, the plurality of mechanical guards comprise vertically oriented mechanical guards mounted to the track system preventing horizontal movement of the mobile robots into the service zone on the deck around the two dimensional array of storage locations.

9. A safety system for an order fulfillment facility comprising a plurality of mobile robots, and at least a two dimensional array of storage locations, a track system configured to allow the plurality of mobile robots to move adjacent the storage locations to perform order fulfillment operations at the storage locations, and a deck at least adjacent the two dimensional array of storage locations, the safety system comprising:
    a plurality of zones within a space defined by at least one of the track system and deck;
    a plurality of mechanical guards mounted with respect to at least one of the track system and deck to define one of the zones of the plurality of zones as a service zone, the plurality of mechanical guards configured to prevent a group of one or more mobile robots of the plurality of mobile robots positioned outside of the service zone from entering the service zone; and
    a safety control system comprising one or more processors configured to implement a safety protocol for safe servicing within the service zone, wherein, in implementing the safety protocol, the one or more processors are configured to:
    shutdown the group of one or more mobile robots outside of the service zone;
    determine when the plurality of mechanical guards are established around the service zone; and
    resume operation of the group of one or more mobile robots outside of the service zone, upon determining that the plurality of mechanical guards are established around the service zone.

10. The safety system of claim 9, wherein, in implementing the safety protocol, the one or more processors are further configured to identify one or more mobile robots of the mobile robots in the service zone, and to route the one or more mobile robots out of the service zone prior to shutting down the order fulfillment operations.

11. The safety system of claim 9, wherein, in implementing the safety protocol, the one or more processors determine when the plurality of mechanical guards are established around the service zone by receipt of signals from the mechanical guards.

12. The safety system of claim 9, wherein, in implementing the safety protocol, the one or more processors are configured to:
    shutdown the mobile robots;
    determine when the plurality of mechanical guards are established around the service zone; and power the mobile robots back up, for operation around the service zone, upon determining that the plurality of mechanical guards are established around the service zone.

13. The safety system of claim 9, further comprising interlock switches for interlocking the plurality of mechanical guards to the control system.

14. The safety system of claim 9, wherein the plurality of mechanical guards are manually installed barriers.

15. The safety system of claim 9, wherein the plurality of mechanical guards are automatically actuated gates, doors or barriers.

16. The safety system of claim 9, wherein the group of one or more mobile robots comprises all of the plurality of mobile robots.

17. A safety system for an order fulfillment facility comprising mobile robots and at least a two dimensional array of storage locations, the mobile robots configured to move adjacent the storage locations to perform order fulfillment operations at the storage locations, the order fulfillment facility further comprising at least one of a track system through the two dimensional array and one or more decks at least adjacent the two dimensional array of storage locations, the safety system comprising:
 a perimeter defining a first space and a second space different than the first space within the order fulfillment facility, the first space in which humans are to operate, and a group of the mobile robots operating in the second space, the perimeter preventing the group of mobile robots from crossing into the first space; and
 a safety control system comprising one or more processors configured to implement a safety protocol for human entry into a service area within the second space, wherein, in implementing the safety protocol, the one or more processors are configured to:
  perform one of sending a shutdown signal, or stop sending an enabling signal, to the group of mobile robots operating, in the second space, the group of mobile robots in the second space shutting down upon receipt of the shutdown signal or upon not receiving the enabling signal;
  after shutdown of the group of mobile robots, determine when a redefined perimeter is established, the redefined perimeter defining an enlarged first space comprising the first space plus at least the service area, and a reduced second space comprising the second space without at least the service area, the redefined perimeter preventing the group of mobile robots from crossing into the enlarged first space; and
  resume operation of the group of mobile robots in the reduced second space of the redefined perimeter upon determining that the redefined perimeter is established.

18. The safety system of claim 17, wherein the one or more processors of the safety control system are further configured to return the redefined perimeter to the perimeter upon determining that service within the service area is completed.

19. The safety system of claim 17, wherein the perimeter and the redefined perimeter extend both horizontally and across multiple vertical levels.

20. The safety system of claim 17, wherein the perimeter and the redefined perimeter each include multiple zones.

21. The safety system of claim 17, wherein the redefined perimeter includes one or more zones from the second space moved to the first space.

22. The safety system of claim 17, wherein the group of mobile robots comprises all of the mobile robots.

* * * * *